(12) United States Patent
Kobayashi (10) Patent No.: US 8,390,166 B2
(45) Date of Patent: Mar. 5, 2013

(54) SEGMENTED CORE MOTOR STATOR (75) Inventor: Kiyoto Kobayashi, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 95 days.

(21) Appl. No.: 13/146,485

(22) PCT Filed: Mar. 23, 2009

(86) PCT No.: PCT/JP2009/001272
§ 371 (c)(1),
(2), (4) Date: Jul. 27, 2011

(87) PCT Pub. No.: WO2010/109515
PCT Pub. Date: Sep. 30, 2010

(65) Prior Publication Data
US 2011/0278983 A1    Nov. 17, 2011

(51) Int. Cl.
*H02K 1/06* (2006.01)
(52) U.S. Cl. ............................................... 310/216.048
(58) Field of Classification Search ........... 310/216.048, 310/216.004, 216.007, 216.009, 216.015, 310/216.051
See application file for complete search history.

(56) References Cited

U.S. PATENT DOCUMENTS 5,142,179 A * 8/1992 Nakamura et al. ..... 310/216.133
5,168,662 A * 12/1992 Nakamura et al. ............... 451/46
7,414,348 B2 * 8/2008 Yamamoto et al. ............ 310/269

FOREIGN PATENT DOCUMENTS

| JP | 3-284145 A | 12/1991 |
| JP | 6-133501 A | 5/1994 |
| JP | 11-234928 A | 8/1999 |
| JP | 2001-25185 A | 1/2001 |
| JP | 2001-95181 A | 4/2001 |
| JP | 2004-080950 A | 3/2004 |
| JP | 2004-208402 A | 7/2004 |
| JP | 2004-266982 A | 9/2004 |
| JP | 2005-312119 A | 11/2005 |
| JP | 2006-50743 A | 2/2006 |
| JP | 2007-336732 A | 12/2007 |
| JP | 2009-17746 A | 1/2009 |

OTHER PUBLICATIONS

International Search Report (PCT/ISA/210) issued on Jun. 23, 2009, by Japanese Patent Office as the International Searching Authority for International Application No. PCT/JP2009/001272.

* cited by examiner

*Primary Examiner* — Nguyen N Hanh
(74) *Attorney, Agent, or Firm* — Buchanan Ingersoll & Rooney PC (57) ABSTRACT

Stator core of motor stator is equipped with a segmented core connecting body which connects in an annular shape a segmented core having a structure whereby laminated core plates are connected and held in place in a laminated state. To connect and fix core laminated plates by clamping, first and second dowels formed in each core laminated plate are used to connect and fix common rings by pressure-fitting them to the first and second end faces at either side of the segmented core connecting body, thus integrating the segmented core connecting body. The segmented core connecting body can be integrated with a simple operation, thus significantly reducing the assembly time for the stator core.

7 Claims, 5 Drawing Sheets

SEGMENTED CORE MOTOR STATOR

TECHNICAL FIELD

The present invention relates to a motor stator formed by connecting a plurality of segmented cores in an annular shape, and particularly relates to a fixed construction for connecting and fixing segmented cores in an annular shape to integrate the cores.

BACKGROUND ART

Segmented core motor stators having stator core structures in which segmented cores are connected in a circular shape are known as stators for brushless motors and AC motors. A segmented core motor stator includes a stator core structure in which a plurality of segmented cores are connected in an annular shape, and a coil winding wrapped on a salient pole (tooth) of each of the segmented cores in the stator core. The segmented cores are arranged in an annular shape in a state of mutual contact by an assembly tool, the end faces of the adjoining segmented cores are joined to each other by welding, bonding, or other means, and an annular stator core is produced.

In the method for assembling a segmented core motor stator disclosed in Patent Document 1, an engaging protrusion and an engaging groove are formed in an insulator attached to each of the segmented cores so that the segmented cores can be simply connected and fixed in an annular shape, and the segmented cores are connected and fixed in an annular shape by mechanically engaging the engaging protrusion and the engaging groove. In the segmented core stator of the motor disclosed in Patent Document 2, a segmented core engaging stop is formed in an annular resin stator cover, and the segmented cores arranged in an annular shape are inserted in the stator cover, producing an arrangement in which the segmented cores are held by the segmented core engaging stops, and the segmented cores are connected and fixed in an annular shape. In the stator core of the brushless DC motor disclosed in Patent Document 3, the segmented cores are inserted in a mold in an annular shape, the motor casing is molded from resin in this state, and the segmented cores are integrated.

A structure in which laminated plates formed of magnetic material are laminated and fixed is also known as a segmented core, as disclosed in Patent Document 4. Flat clamping is used as the method for fixing steel plates and other laminated plates. For example, a half-blanked dowel (protrusion) obtained by the half-blanking of a laminated plate in the thickness direction (lamination direction) is formed by a half-blanking procedure using a punch, and the laminated plates are connected and fixed to each other by pressure-fitting, and clamping and fixing, the half-blanked dowel of one laminated plate into a recess on the back surface of a half-blanked dowel of another laminated plate.

Patent Document 1: Japanese Laid-Open Patent Publication No. 2005-312119
Patent Document 2: Japanese Laid-Open Patent Publication No. 2004-266982
Patent Document 3: Japanese Laid-Open Patent Publication No. 2009-17746
Patent Document 4: Japanese Laid-Open Patent Publication No. 2001-95181

DISCLOSURE OF THE INVENTION

Problems to be Solved by the Invention

In cases in which a stator of a motor is constructed using segmented cores, it is important that the operation in which the segmented cores are connected and fixed in an annular shape to produce the stator core be performed in a simple and efficient manner.

An object of the present invention is to provide a segmented core motor stator in which the operation for connecting and fixing the segmented cores in an annular shape can be performed in a simple and efficient manner in cases in which laminated cores are used as the segmented cores.

Means Used to Solve the Above-Mentioned Problems

In order to solve the aforementioned problems, there is provided a segmented core motor stator of the present invention, characterized in comprising:

a segmented core connecting body constructed by connecting a plurality of segmented cores in an annular shape, and a first ring fixed to one annular first end face in the segmented core connecting body;

wherein each of the segmented cores is constructed from a plurality of laminated plates that are laminated together;

a first dowel formed by pressing the laminated plates at identical points in identical directions along a lamination direction of the plates is provided to each of the laminated plates of each of the segmented cores;

the plurality of laminated plates are connected and fixed in a laminated state by clamping and fixing the first dowels of the adjoining laminated plates to each other in the lamination direction;

the first dowel protrudes from an outside end face of one of a first laminated plate selected from the first laminated plate and a second laminated plate positioned on both sides of the lamination direction in each of the segmented cores;

the first end face of the segmented core connecting body is defined by the outside end face of the first laminated plate;

a first dowel hole into which each of the first dowels can be pressure-fitted is formed in the first ring at a location corresponding to the first dowel protruding from the outside end face of the first laminated plate in each of the segmented cores connected in an annular shape; and the first ring is connected and fixed to the segmented core connecting body by pressure-fitting and fixing the first dowels in the corresponding first dowel holes.

In the motor stator of the present invention, the laminated cores having a structure in which the laminated plates are connected and fixed in a laminated state are used as the segmented cores. In addition, the first dowels formed on the laminated plates are used in order to connect and fix the laminated plates by clamping, the first ring is pressure-fitted and fixed to the annular first end face of the segmented core connecting body formed of annularly connected segmented cores, the segmented core connecting body is integrated, and each of the segmented cores remains in place.

Accordingly, the segmented core connecting body can be integrated by a simple operation in which the first ring is pressure-fitted and fixed to the first end surface of the segmented core connecting body, and the assembly time for a stator core can therefore be greatly reduced. In addition, distortion (deformation), reduction in magnetic characteristics, and other problems usually occur in segmented cores in cases in which the segmented cores are connected and fixed to each other by welding, but such problems do not occur according to the present invention. Moreover, harmful effects occur in which the adhesive attaches to a section other than the adhesive surface on the segmented cores when the quantity of applied adhesive is too great in cases in which the segmented cores are bonded and fixed to each other using an adhesive, and poor adhesion occurs when an insufficient quantity of adhesive is applied, making it necessary that the quantity of applied adhesive be accurately managed. Such problems do not occur according to the present invention.

Here, the clamping dowels are generally formed at a plurality of places, and the laminated plates are clamped and fixed to each other at the plurality of points in order to securely connect and fix the laminated plates. Specifically, a second dowel is formed by pressing the laminated plates in the direction opposite to the first dowel at a position different from that of the first dowel in each of the laminated plates of the segmented cores, and a plurality of laminated plates are connected and fixed in a laminated state by clamping and fixing the second dowels of the adjoining laminated plates to each other.

In this case, in order to fix the second ring to the second annular end face on the side opposite to the first end face in the segmented core connecting body and securely integrate the segmented core connecting body, a second dowel hole into which each of the second dowels can be pressure-fitted is preferably formed in the second ring at a location corresponding to the second dowel protruding from the outside end face of the second laminated plate in each of the segmented cores connected in an annular shape, and the second connecting ring is preferably connected and fixed to the segmented core connecting body by pressure-fitting and fixing the second dowels in the corresponding second dowel holes.

In this case, identical common rings can be used as the first ring and the second ring when the first ring and the second ring are formed in bilaterally symmetrical positions in each of the segmented cores. Specifically, one of the common rings can be connected and fixed to the first end face or the second end face in a reversed state relative to the other common ring. This is advantageous in that the operation for integrating the segmented core connecting body is simplified when using common rings in comparison with cases in which a different type of ring is used.

When viewed from the direction of the center axis line of the stator core, a shape including an arc-shaped section that has a constant width and a salient pole section protruding from an inner circumferential surface of the arc-shaped section toward the central axis line of the stator core can be used as the segmented core. In this case, a connecting protrusion is preferably formed on one of the circumferentially oriented end faces in the arc-shaped section, and a connecting groove into which the connecting protrusion can be inserted is preferably formed on the other circumferentially oriented end face in the arc-shaped section. In this way, the annular segmented core connecting body can be simply constructed by inserting the connecting protrusion of one of the segmented cores on the adjoining segmented cores into the connecting groove of another segmented core.

The first dowel is formed on the arc-shaped section in each of the segmented cores, and the first ring can be connected and fixed to the annular first end face defined by the arc-shaped section.

An advantage is that a separate component need not be attached in order to insulate the end face of the core connecting body when an insulating ring formed from an insulating material is used as the first ring.

Effect of the Invention

In the motor stator of the present invention, laminated cores having a structure in which laminated plates are connected and fixed in a laminated state are used as the segmented cores. A first dowel formed on each of the laminated plates is used in order to clamp and fix the laminated plates, a first ring is connected and fixed by pressure-fitting to a first annular end face of the segmented core connecting body that is formed of annularly connected segmented cores, the segmented core connecting body is integrated, and the segmented cores remain in place. Accordingly, the segmented core connecting body can be integrated by a simple operation in which the first ring is pressure-fitted and fixed to the first end face of the segmented core connecting body, and the assembly time for the motor stator can therefore be greatly reduced.

KEY

1 Motor stator
1a Central axis line of stator core
2, 2(1) to 2(12) Segmented core
3 Stator core
6 Coil winding
8 Core body
8a Arc-shaped section
8b Salient pole section
9a Connecting protrusion
9b Connecting groove
10 Insulator
11 Coil bobbin
12 Core laminated plate
12a First dowel
12b Second dowel
12c, 12e Outside end face
12d, 12f Recess
14 Tubular body part
15 Outer circumferential flange
16 Inner circumferential flange
30 Segmented core connecting body
31 First end face
32 Second end face
33 Common ring
33a Dowel pressure-fitting hole
33b Front surface
33c Back surface

BEST MODE FOR CARRYING OUT THE INVENTION

Embodiments of a segmented core motor stator in which the present invention is used will be described below with reference to the drawings.

Figure 1:
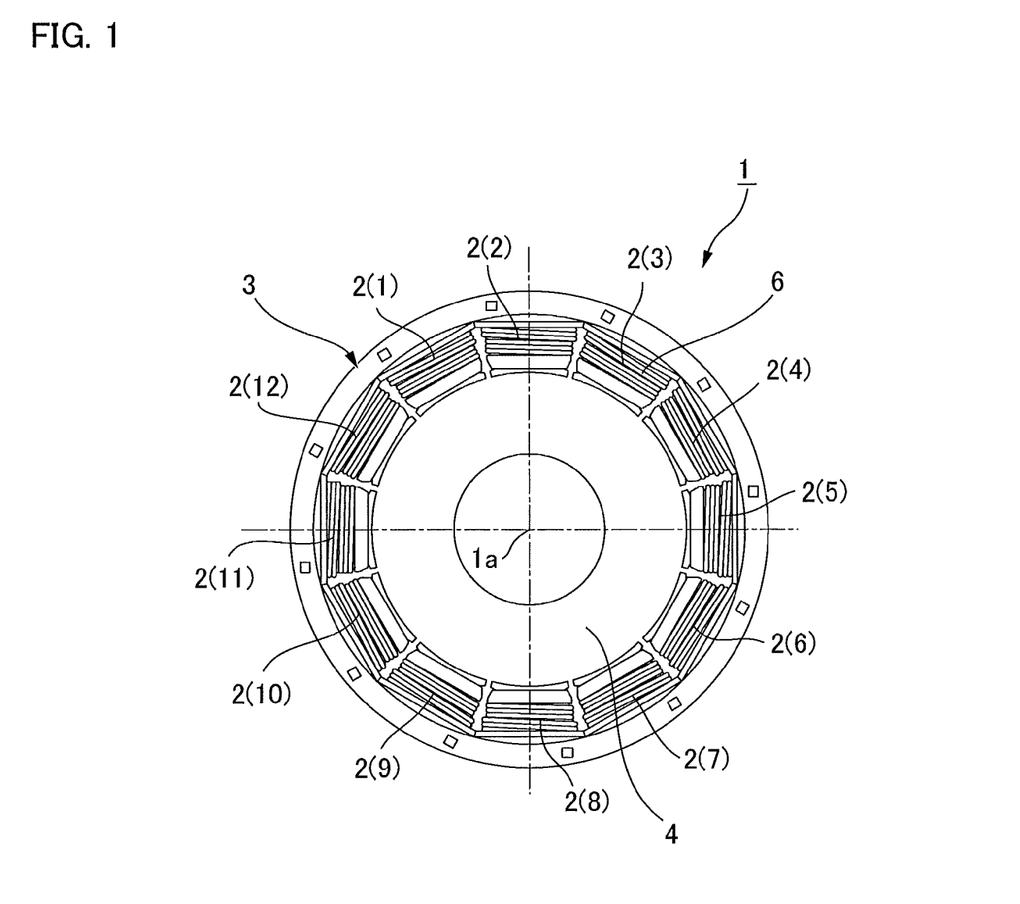
FIG. 1 is a front view showing a segmented core motor stator in which the present invention is used.

FIG. 1 is a front view showing a segmented core motor stator according to the present embodiment. A motor stator 1 has a stator core 3 constructed by connecting twelve segmented cores 2(1) to 2(12) in an annular shape, and a discoid wiring board 4 coaxially attached to the stator core 3 on one side of the central axis 1a of the stator core 3. A coil winding 6 is wound on each of the segmented cores 2(1) to 2(12), and both ends of the coil windings 6 are soldered to a junction land (not shown) formed on the wiring board 4 and are wired to each other according to a predetermined aspect by a wiring pattern (not shown) provided with the junction land. Hereinafter, the segmented cores 2(1) to 2(12) will sometimes be collectively referred to as the "segmented cores 2,"

Figure 2:
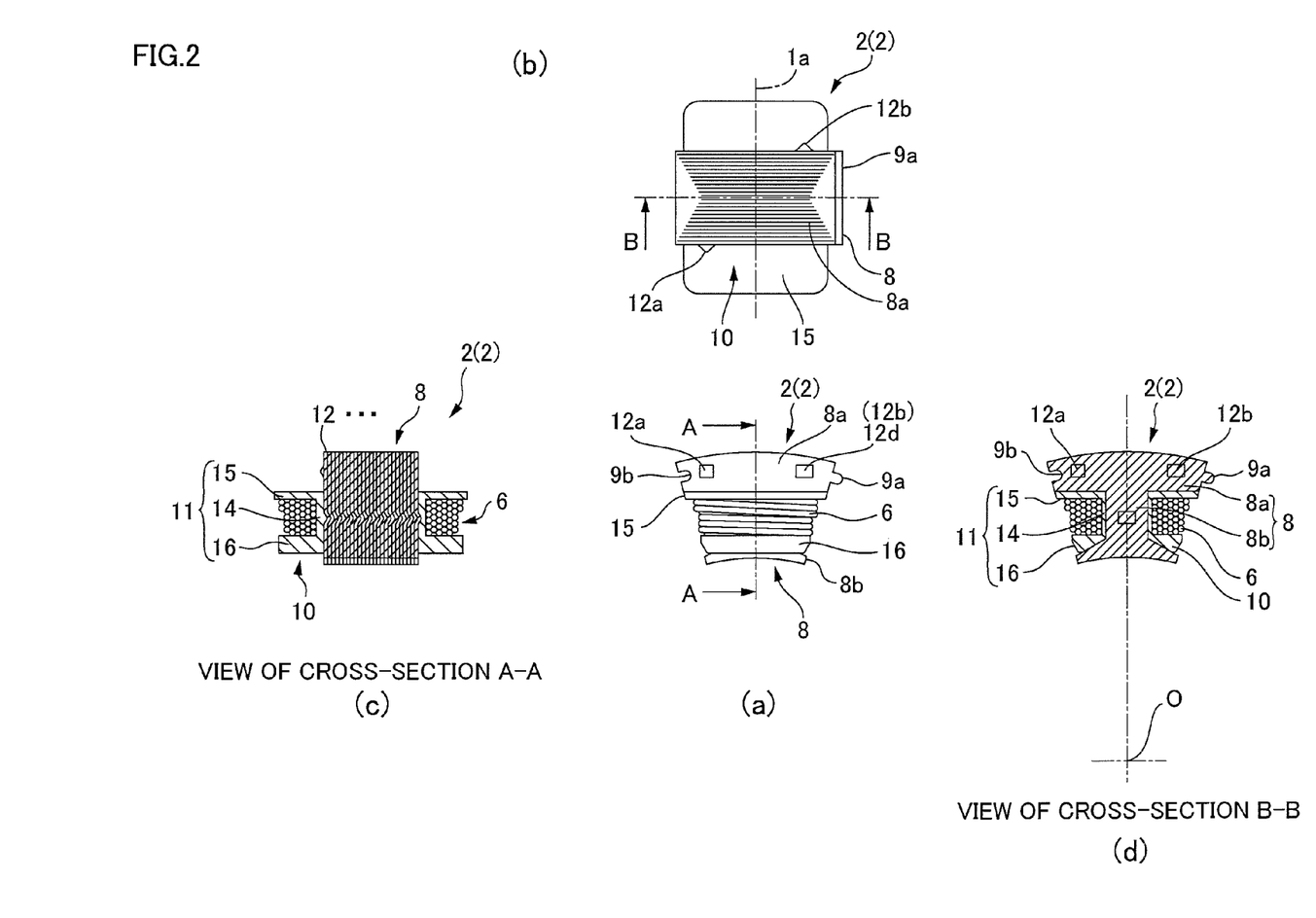
FIG. 2(a) is a front view of the segmented core in FIG. 1.
FIG. 2(b) is a view of an outer circumferential end face in a segmented core as seen from the outer circumference of a stator core.
FIG. 2(c) is a schematic cross-sectional view of a section in a segmented core cut along line A-A in FIG. 2(a)
FIG. 2(d) is a schematic cross-sectional view of a section in a segmented core cut along the line B-B in FIG. 2(b)

FIG. 2 is a view showing the segmented core 2(2), wherein (a) is a front view thereof, (b) is a view of an outer circumferential end face as seen from the outer circumference of a stator core, (c) is a schematic cross-sectional view of a section cut along line A-A in (a), and (d) is a schematic cross-sectional view of a section cut along line B-B in (b). The segmented cores 2(1) to 2(12) have an identical structure. Therefore, this structure will be explained using the segmented core 2(2) as an example.

The segmented core 2(2) includes a core body 8 formed of magnetic material, and the core body 8 includes an arc-shaped section 8a and a salient pole section 8b protruding from the inner circumferential surface of the arc-shaped section 8a toward the arc center O of the inner circumferential surface. A connecting protrusion 9a protruding in the connecting direction of the segmented core is formed on one end in the arc-shaped section 8a. A connecting groove 9b into which the connecting protrusion 9a can be detachably inserted is formed on the other end of the arc-shaped section 8a. The distal side of the protrusion 9a in this example has a semicircular contoured shape when viewed from the direction of the central axis 1a of the stator core, and the groove 9b has a cross-sectional shape complementary to the contoured shape of the protrusion 9a.

The segmented core 2(2) is a laminated core, and the core body 8 is constructed by laminating, and then connecting and fixing, core laminated plates 12 that have a constant thickness and are contoured corresponding to the arc-shaped section 8a and the salient pole section 8b. The core body 8 is covered by an insulator 10 formed of an insulating resin, and the coil winding 6 is wound on the salient pole section 8b of the core body 8 via the insulator 10.

The insulator 10 includes a coil bobbin 11 on which the coil winding 6 is wrapped. The coil bobbin 11 includes a tubular body part 14 in which the salient pole section 8b is inserted, an outer circumferential flange 15 integrally formed on the end part of the stator core in the tubular body part 14 toward the outer circumference, and an inner circumferential flange 16 integrally formed on the end part of the stator core in the tubular body part 14 toward the inner circumference. The outer and inner circumferential flanges 15, 16 are rectangular frames extending to the outside along the direction orthogonal to the central axis line of the tubular body part 14, and the outer circumferential flange 15 is wider than the inner circumferential flange 16. The insulator 10 having such a shape is formed using outsert molding by, for example, inserting the core body 8 into a resin mold and injecting insulating resin.

Figure 3:
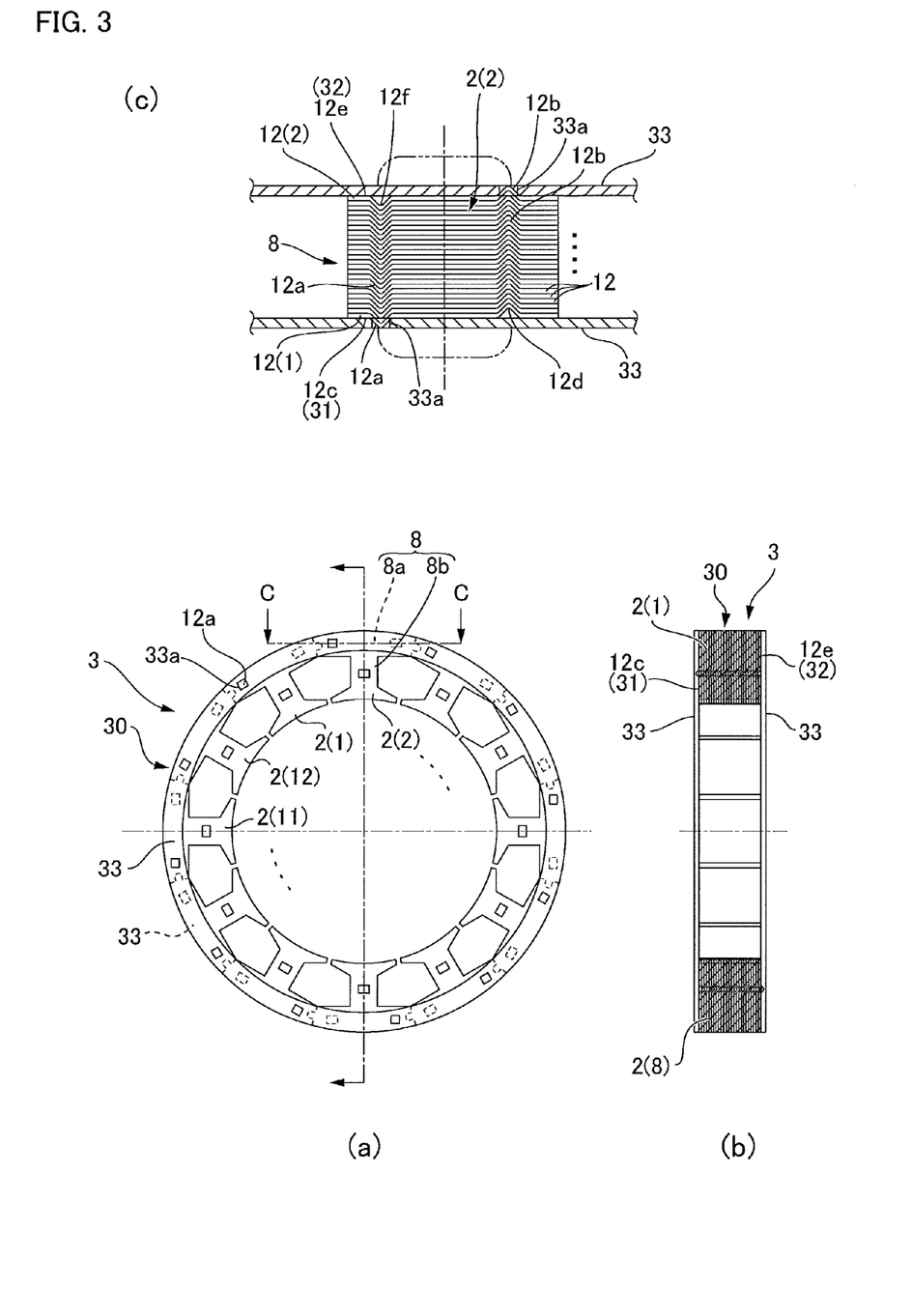
FIG. 3(a) is a front view showing a stator core of the motor stator in FIG. 1.
FIG. 3(b) is a schematic longitudinal sectional view of FIG. 3(a)
FIG. 3(c) is a partial enlarged cross-sectional view of a section cut along line C-C in FIG. 3(a)

FIG. 3(a) is a plan view showing the stator core 3, FIG. 3(b) is a schematic longitudinal sectional view thereof, and FIG. 3(c) is a partial enlarged cross-sectional view showing a section cut along line C-C. The coil winding 6 and the insulator 10 are omitted from these drawings. The stator core 3 includes a segmented core connecting body 30 constructed by connecting twelve segmented cores 2(1) to 2(12) in an annular shape, and common rings 33 (first ring, second ring) connected and fixed to an annular first end face 31 and second end face 32, respectively, on both sides of the segmented core connecting body 30. The common rings 33 are connected and fixed in a reversed state relative to the second end face 32.

The core body 8 of each of the segmented cores 2 is constructed by laminating, and then connecting and fixing, many core laminated plates 12. A first dowel 12a formed by pressing identical points in an identical direction along the lamination direction of the plates is formed on each of the core laminated plates 12, as can be seen from FIG. 3(c). A second dowel 12b formed by pressing in the opposite direction is formed at a position different from that of the first dowel 12a.

In the present example, the first and second dowels 12a, 12b are formed in bilaterally symmetrical positions in the arc-shaped section 8a of each of the core laminated plates 12. The first and second dowels 12a, 12b are dowels formed by pressing a rectangular region of part of each of the core laminated plates 12 and causing the plate to protrude in a V-shape toward one side of the thickness direction of the plate. A dowel may also be formed so that part of each of the core laminated plates 12 is pressed in a circular shape and caused to protrude in a hemispheric shape.

In the adjoining core laminated plates 12, the first dowel 12a of one of the core laminated plates 12 is clamped and fixed to a V-shaped recess on the back surface of the first dowel 12a of another of the core laminated plates 12, and the dowels are connected and fixed to each other. In the same manner, the second dowel 12b of the one the core laminated plates 12 is clamped and fixed to a V-shaped recess on the back surface of the second dowel 12b of another of the core laminated plates 12, and the dowels are connected and fixed to each other.

In the core body 8 of the structure in which the core laminated plates 12 are thus laminated, and then connected and fixed, the core laminated plates positioned on both sides of the lamination direction of the core laminated plates 12 are referred to as a first core laminated plate 12(1) and a second core laminated plate 12(2), respectively. The first dowel 12a protrudes outward on the outside end face 12c of the first core laminated plate 12(1), and a recess 12d on the back surface of the second dowel 12b is exposed. Conversely, a recess 12f on the back surface of the first dowel 12a is exposed, and the second dowel 12b protrudes outward, on an outside end face 12e of the second core laminated plate 12(2).

Figure 4:
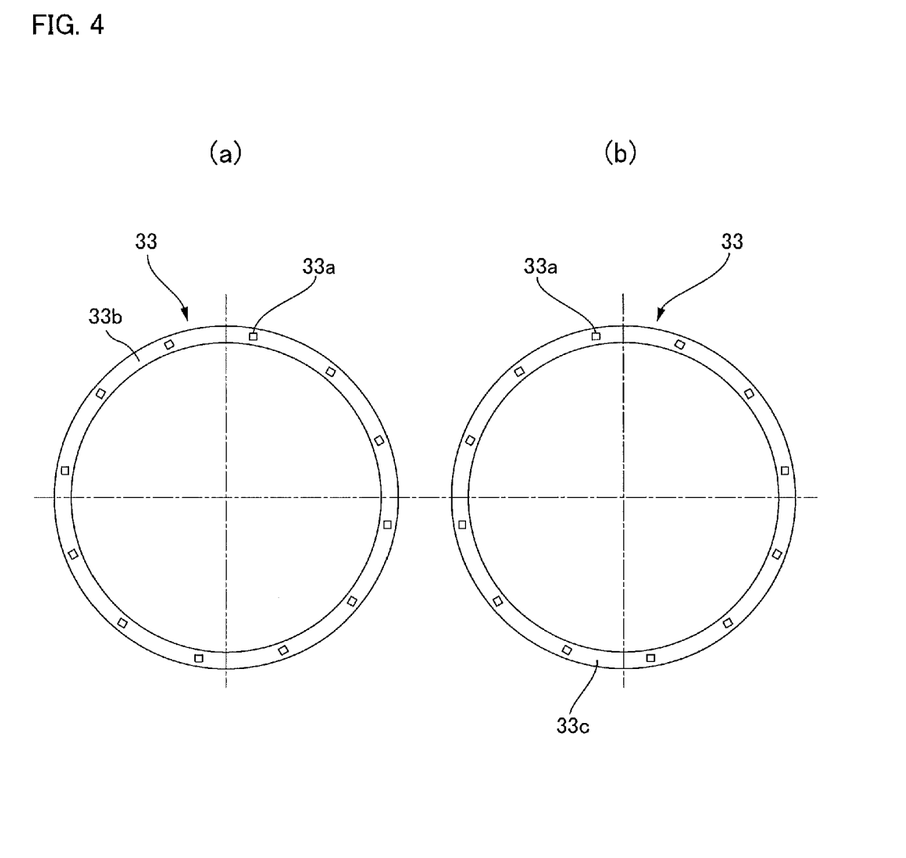
FIG. 4(a) is a front view showing a common ring of the stator core in FIG. 3.
FIG. 4(b) is a rear view thereof.

FIGS. 4(a) and 4(b) are plan views showing the front surface and back surface of the common rings 33 (first ring and second ring). As described in reference to FIGS. 3 and 4, the common rings 33 are rings that have a constant thickness and are provided with a width that includes the first and second annular end faces 31, 32 of the segmented core connecting body 30, and are formed of for example, a steel plate or other magnetic material. The common rings 33 may be formed of a synthetic resin or other insulating material, and in this case, the rings may also be used as insulating members for the first and second end faces 31, 32 of the segmented core connecting body 30.

Twelve pressure-fitting holes 33a are formed in the common rings 33 at constant angular intervals along the circumferential direction. The first dowel 12a and the second dowel 12b can be pressure-fitted and fixed in each of the dowel pressure-fitting holes 33a. When the common rings 33 are viewed from the front surface 33b of the rings as shown in FIG. 4(a), the pressure-fitting holes 33a are formed at positions corresponding to the twelve first dowels 12a protruding from the first end face 31 in the segmented core connecting body 30. When the common rings 33 are viewed from the back surface 33c of the rings as shown in FIG. 4(b), the dowel pressure-fitting holes 33a are formed at positions corresponding to the twelve second dowels 12b protruding from the second end face 32 in the segmented core connecting body 30.

Accordingly, one of the common rings 33 is positioned on the first end face 31 of the segmented core connecting body 30 in a state in which the front surface 33b of the ring is facing the outside, and the first dowels 12a are pressure-fitted and fixed in the dowel pressure-fitting holes 33a. The common ring 33 is thereby fixed to the first end face 31. The other of the common rings 33 is positioned on the second end face 32 of the segmented core connecting body 30 in a state in which the back surface 33c is facing the outside, and the second dowels 12b are pressure-fitted and fixed in the dowel pressure-fitting holes 33a. The common ring 33 is thereby fixed to the second end face 32. The annularly connected segmented core 2 is thus integrated by the two common rings 33 fixed to both sides of the core.

The first dowel 12a and the second dowel 12b can also be formed so as to protrude in identical directions. In this case, a state is established in which the first dowel 12a and the second dowel 12b protrude from one of the end faces, for example, the first end face 31, of the segmented core connecting body 30. Accordingly, in a preferred arrangement, the rings are manufactured having the number of dowel pressure-fitting holes corresponding to the dowels, and are fixed to the first end face 31.

In the present example, the common rings 33 are fixed on both sides of the segmented core connecting body 30 to integrate the segmented core connecting body 30, but the rings can also be fixed to only one end face, for example, the first end face 31, of the segmented core connecting body 30 to integrate the segmented core connecting body 30.

Although this has been omitted from the description, a dowel for clamping and fixing is formed at one or a plurality of places on the salient pole section 8b of the segmented core to laminate and fix the core laminated plates.

(Procedure for Assembling the Stator Core)

Figure 5:
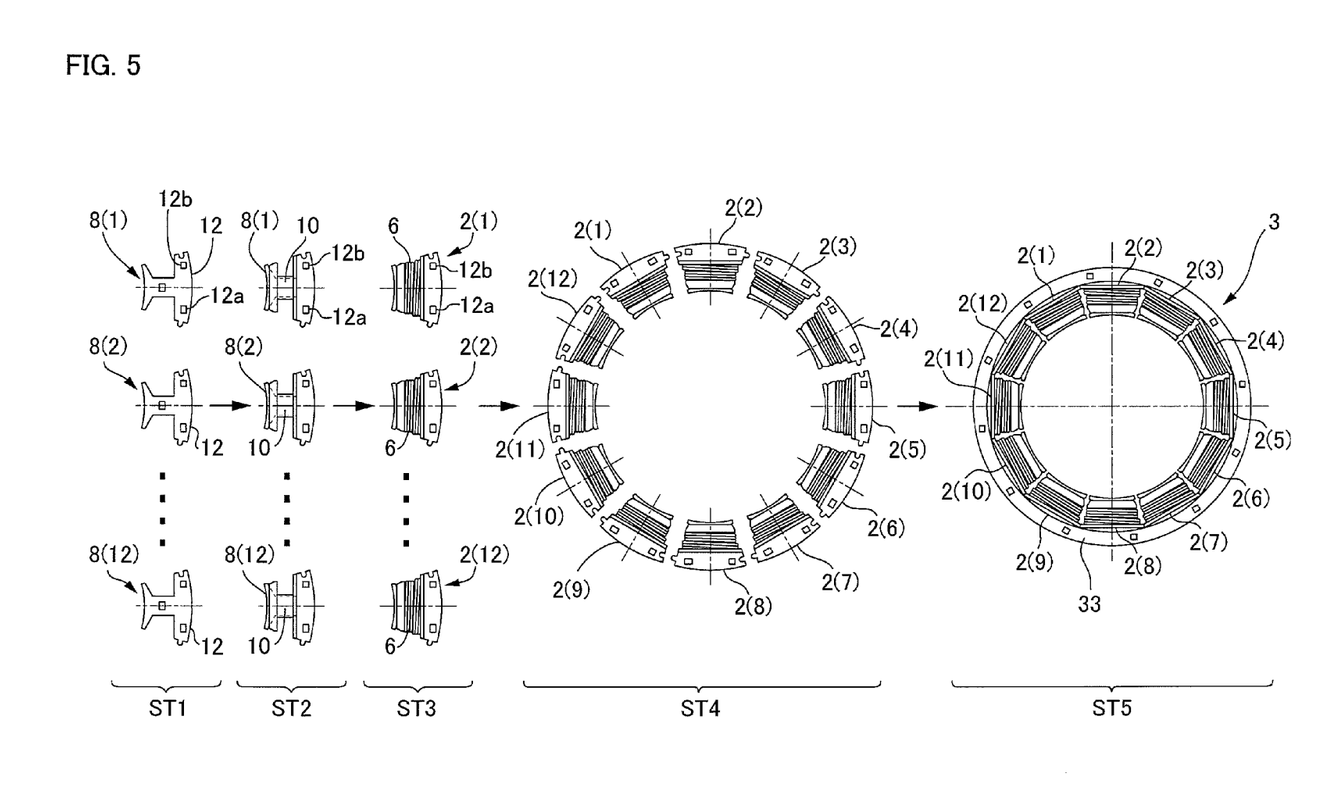
FIG. 5 is an explanatory view showing an assembly procedure for a stator core.

FIG. 5 is an explanatory view showing the procedure for assembling the stator core 3. The procedure for assembling the stator core 3 is outlined with reference to this drawing. The core laminated plates 12 are first punched from a steel plate or other plate, as shown in step ST1 in FIG. 5. At this time, the half-blanked first dowel 12a and second dowel 12b are also formed at the same time on the core laminated plates 12. The core body 8 is produced by laminating, and then connecting and fixing, the manufactured core laminated plates 12. The segmented core motor stator 1 of the present example has twelve poles, and twelve core bodies 8(1) to 8(12) are therefore prepared.

Outsert molding is subsequently performed in step ST2 to form the insulator 10 in order to insulate and coat the front surface of each of the core bodies 8(1) to 8(12).

The coil winding 6 is subsequently wrapped in step ST3 on the salient pole section 8b of each of the core bodies 8(1) to 8(12) via the insulator 10. The segmented cores 2(1) to 2(12) are thereby obtained.

The segmented cores 2(1) to 2(12) are then arranged in a circular shape in step ST4. The cores are connected in an annular shape by inserting the connecting protrusion of one adjoining segmented core into the connecting groove of another segmented core, and the segmented core connecting body 30 is produced.

The common rings 33 are subsequently fixed in step ST5 to the end faces on both sides of the segmented core connecting body 30. A stator core 3 in which annularly connected segmented cores are integrated is thereby obtained.

The invention claimed is:

1. A segmented core motor stator comprising:
   a segmented core connecting body constructed by connecting a plurality of segmented cores in an annular shape, and
   a first ring fixed to one annular first end face in the segmented core connecting body;
   wherein each of the segmented cores is constructed from a plurality of laminated plates that are laminated together;
   a first dowel formed by pressing the laminated plates at identical points in identical directions along a lamination direction of the plates is provided to each of the laminated plates of each of the segmented cores;
   the plurality of laminated plates are connected and fixed in a laminated state by clamping and fixing the first dowels of the adjoining laminated plates to each other in the lamination direction;
   the first dowel protrudes from an outside end face selected from the first laminated plate and a second laminated plate positioned on both sides of the lamination direction in each of the segmented cores;
   the first end face of the segmented core connecting body is defined by the outside end face of the first laminated plate;
   a first dowel hole into which each of the first dowels can be pressure-fitted is formed in the first ring at a location corresponding to the first dowel protruding from the outside end face of the first laminated plate in each of the segmented cores connected in an annular shape; and
   the first ring is connected and fixed to the segmented core connecting body by pressure-fitting and fixing the first dowels in the corresponding first dowel holes.

2. The motor stator according to claim 1, wherein a second dowel formed by pressing the laminated plates in the direction opposite to the first dowel at a position different from that of the first dowel is provided to each of the laminated plates of the segmented cores; and
   a plurality of laminated plates are connected and fixed in a laminated state by clamping and fixing the second dowels of the adjoining laminated plates to each other.

3. The motor stator according to claim 2, comprising a second ring fixed to an annular second end face on the side opposite to the first end face in the segmented core connecting body;
   wherein the second end face is defined by an outside end face of the second laminated plate of each of the segmented cores;
   a second dowel hole into which each of the second dowels can be pressure-fitted is formed in the second ring at a location corresponding to the second dowel protruding from the outside end face of the second laminated plate in each of the segmented cores connected in an annular shape; and
   the second connecting ring is connected and fixed to the segmented core connecting body by pressure-fitting and fixing the second dowels in the corresponding second dowel holes.

4. The motor stator according to claim 3, wherein the first dowel and the second dowel are formed in each of the segmented cores in bilaterally symmetrical positions;
   the first ring and the second ring are identical common rings; and
   one of the common rings is pressure-fitted and fixed in the first dowel of the first end face or the second dowel of the second end face in a reversed state relative to the other common ring.

5. The motor stator according to claim 1, wherein:

the segmented core has an arc-shaped section having a constant width, and a salient pole section protruding from an inner circumferential surface of the arc-shaped section toward a central axis line of the stator core, when viewed from the direction of the center axis line of the stator core;

a connecting protrusion is formed on one of the circumferentially oriented end faces in the arc-shaped section;

a connecting groove into which the connecting protrusion can be inserted is formed on the other circumferentially oriented end face in the arc-shaped section; and the adjoining segmented cores are connected to each other by inserting the connecting protrusion of one of the segmented cores into the connecting groove of another segmented core.

6. The motor stator according to claim 5, wherein:

the first dowel is formed on the arc-shaped section in each of the segmented cores; and the first ring is connected and fixed to the annular first end face defined by the arc-shaped section.

7. The motor stator according to claim 1, wherein the first ring is an insulating ring formed from an insulating material.

* * * * *